United States Patent [19]
David

[11] 3,763,568
[45] Oct. 9, 1973

[54] SPECTACLE LENS LAYOUT APPARATUS

[76] Inventor: Andrew M. David, 107 Crescent Dr., Hampton, Va. 23361

[22] Filed: Sept. 21, 1971

[21] Appl. No.: 182,426

[52] U.S. Cl. ............ 33/174 A, 248/361 B, 217/59, 220/41
[51] Int. Cl. ..................... G02b 27/2, G02b 27/34
[58] Field of Search.................. 33/174 A; 312/290; 40/132 A, 132 D; 217/59, 62; 220/41; 248/361 B

[56] References Cited
UNITED STATES PATENTS

| | | |
|---|---|---|
| 2,582,048 | 1/1952 | Line .................................. 33/174 A |
| 886,250 | 4/1908 | Roberts .............................. 217/62 |
| 1,456,582 | 5/1923 | Wood .................................. 217/62 |
| R16,927 | 4/1928 | Rosencrans ..................... 248/361 B |
| 2,532,083 | 11/1950 | Brenner .............................. 217/62 |

Primary Examiner—Stanley N. Gilreath
Assistant Examiner—Jon W. Henry
Attorney—B. P. Fishburne, Jr.

[57] ABSTRACT

A protractor and light box for use in laying out guide markings on spectacle lenses prior to grinding features a simplified light box structure which enables quick replacement or changing of protractor cards. The protractor card forms a unit assembly with the light box top transparent plate and spring-loaded lens holder. The unit assembly is readily removable from the box body with a minimum of effort.

1 Claim, 6 Drawing Figures

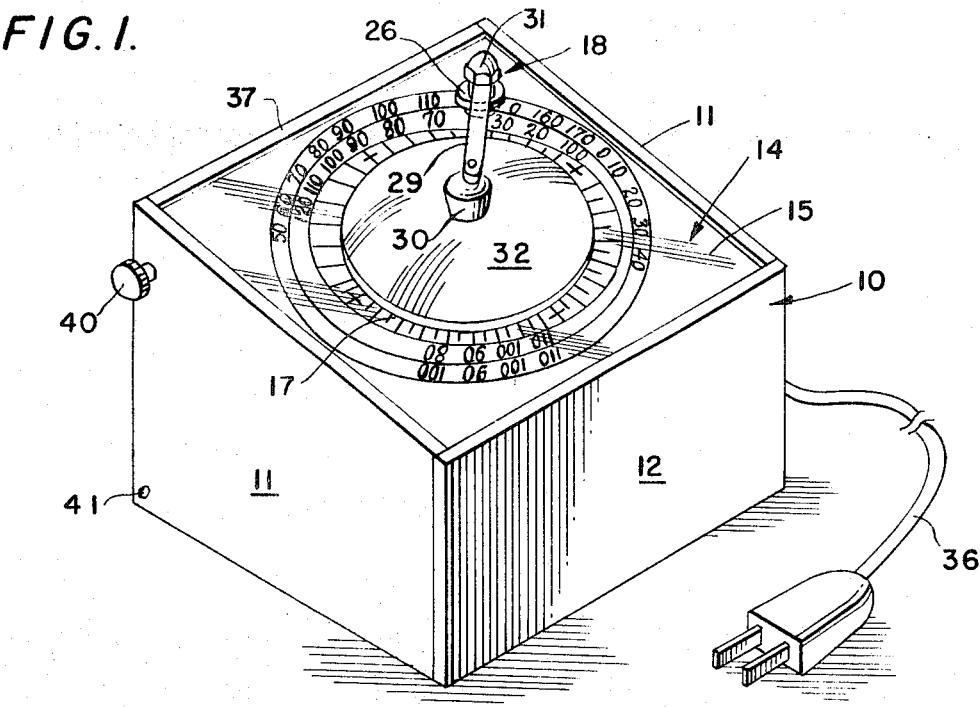
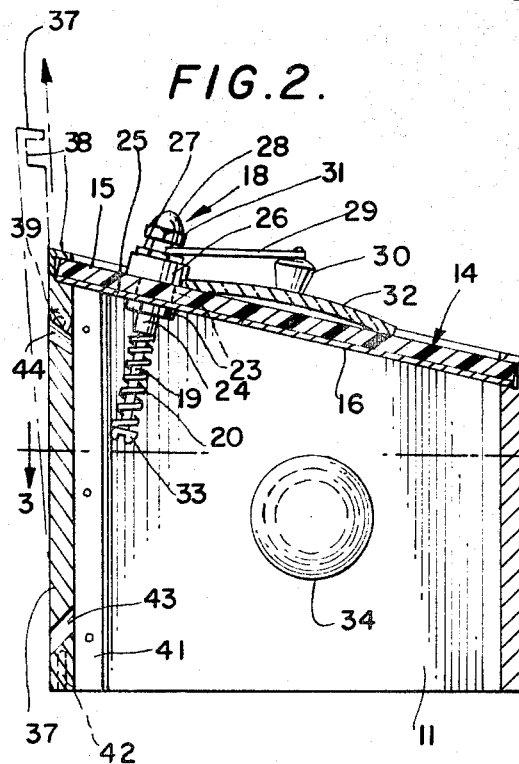
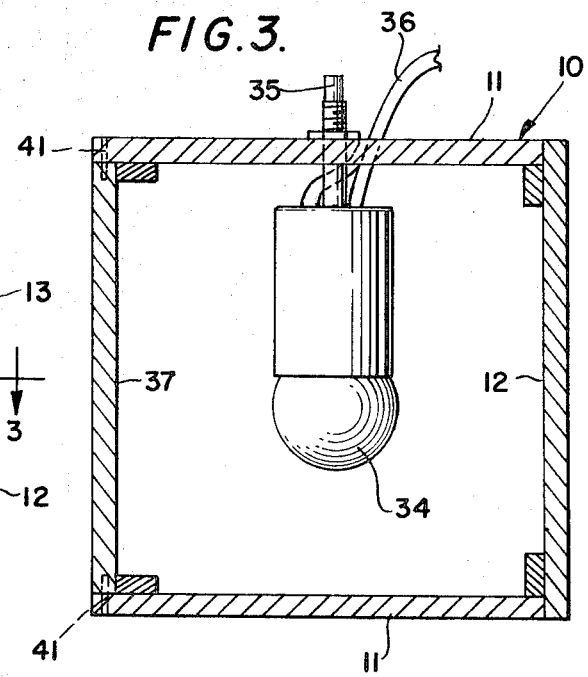

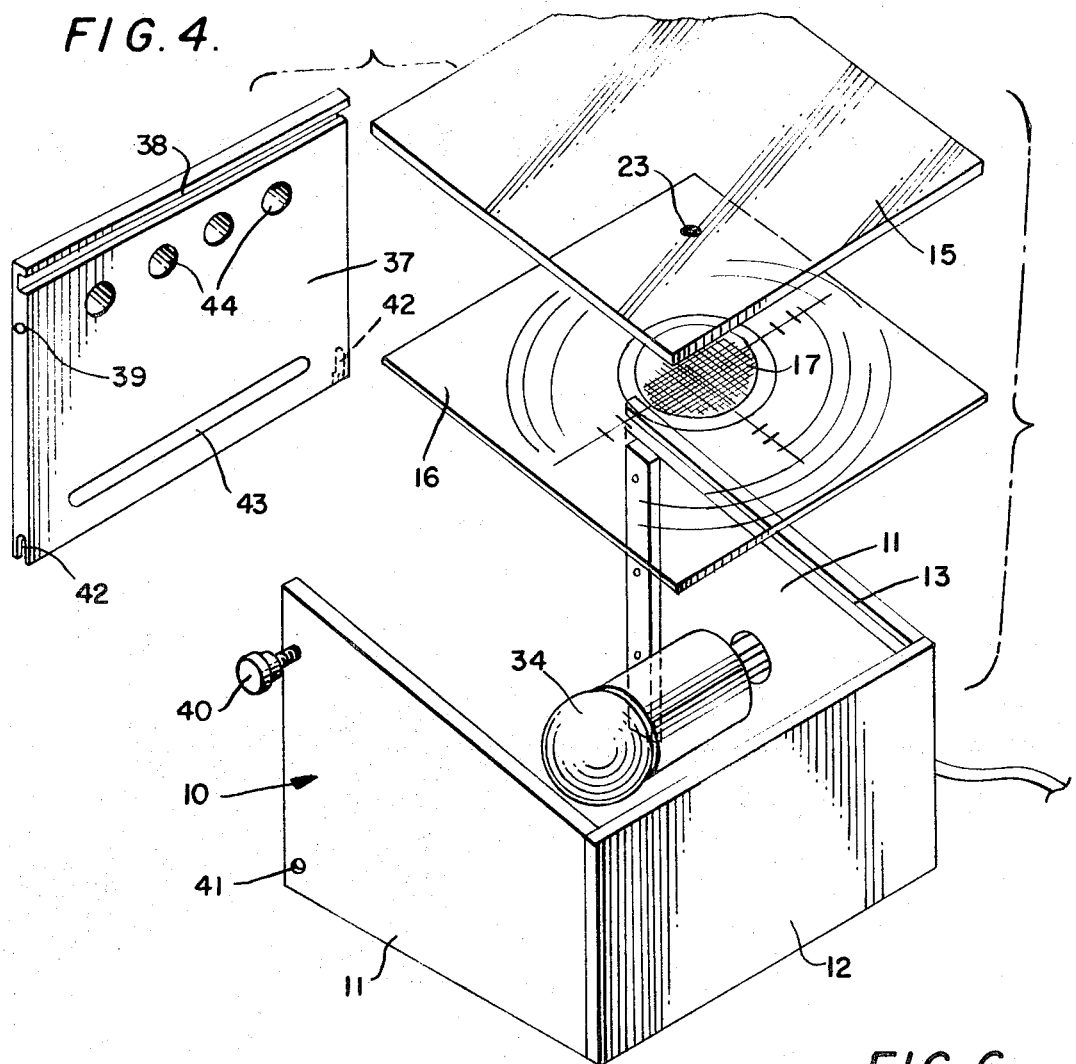
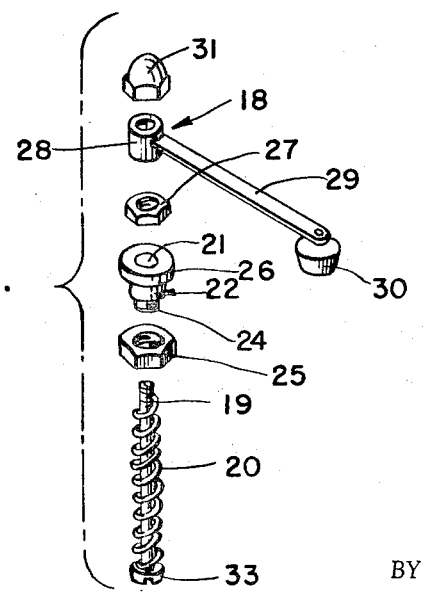
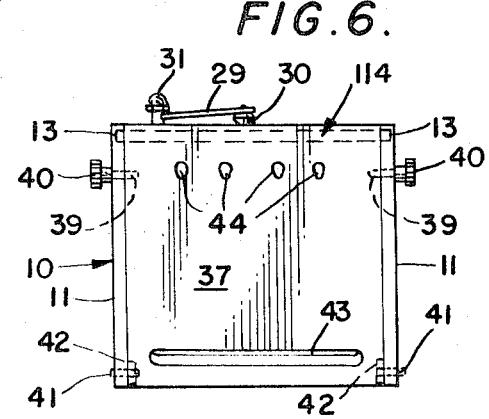

SPECTACLE LENS LAYOUT APPARATUS

The objective of the invention is to improve upon and considerably simplify the prior art relative to spectacle lens layout means particularly as disclosed in prior U. S. Pat. No. 2,582,048 issued to J. H. Line on Jan. 8, 1952. In this patent, the problems and techniques incident to marking various types of spectacle lenses prior to grinding are rather fully dealt with and need not be repeated herein for a proper understanding of the improvements.

It has been discovered in actual practice that a number of the refinements proposed in the Line patent are not essential to the proper laying out of guide markings on most spectacle lenses. For example, the experienced technician will ordinarily not require a micrometer adjustment of a lens blank on the underlying protractor card and may actually prefer to manipulate or shift the lens blank by hand, as a result of extended experience. Accordingly, one of the chief objects of this invention is to greatly simplify the prior art through the provision of a much less expensive and less complicated layout apparatus. The improved apparatus includes a simplified light box having means to facilitate the quick removal of the protractor unit which consists of the printed protractor card, a covering transparent plate and the improved and simplified lens blank holder which is assembled to the card and protective plate. Therefore, this unit can be quickly replaced by a like unit possessing a protractor card with different forms of indicia. In general, the apparatus is much simpler to use than prior art devices, much more economical and practical, and is fully capable of satisfying the needs for properly laying out guide markings on most commonly used lenses.

Other features and advantages of the invention will become apparent during the course of the following description.

BRIEF DESCRIPTION OF DRAWING FIGURES

FIG. 1 is a perspective view of a spectacle lens layout apparatus embodying the invention.

FIG. 2 is a central vertical section through the apparatus.

FIG. 3 is a horizontal section taken on line 3—3 of FIG. 2.

FIG. 4 is an exploded perspective view of the apparatus.

FIG. 5 is an exploded perspective view of a spring-loaded lens holder.

FIG. 6 is a rear elevational view of the apparatus on a reduced scale.

DETAILED DESCRIPTION

Referring to the drawings in detail wherein like numerals designate like parts throughout the same, the numeral 10 designates an opaque light box body portion having a pair of side walls 11 and a front wall 12 suitably rigidly joined to the two side walls. The top, bottom and rearward side of the body portion 10 are open as depicted clearly in FIG. 4. As shown, the top of the light box body portion 10 slopes downwardly from its rear open side at an angle below the horizontal of about 15°. The two side walls 11 and the front wall 12 are all grooved near their upper edges and in their interior faces as indicated by the numeral 13. The arrangement is such that a groove extends continuously around the three sides of the body portion 10 just under the top edge thereof. This continuous groove is open at the rear side of the body portion 10 and forms an important feature of the invention in allowing for the quick removal or changing of a protractor and lens holder unit assembly indicated by the numeral 14.

The assembly 14 consists of a top transparent rectangular plate 15 of clear lucite or the like having immediately therebelow and in contact therewith a relatively thin translucent protractor card 16 of the same type disclosed in the aforementioned patent to Line. The protractor card 16 contains known indicia utilized in the laying out of guide markings on spectacle lens blanks prior to grinding lenses. The use of such conventional indicia is well known in the art and is discussed in the Line patent and elsewhere and need not therefore be discussed in detail in this application. The printed indicia on the protractor card 16 is shown generally at 17 in the drawings.

The two flat elements 15 and 16 are maintained in assembled relationship by the action of a spring-loaded adjustable lens blank clamp or holder 18, consisting of a screw 19 surrounded by a compressible coil spring 20. The screw 19 engages upwardly through the smooth bore 21 of a bushing 22 which is seated in aligned openings 23 of the elements 15 and 16. A lower threaded extension 24 of the bushing 22 projects below the protractor card 16, FIG. 2, and receives a clamping nut 25 which bears against the bottom of the card 16. An upper enlarged shoulder 26 on the bushing 22 clampingly engages the top face of the transparent plate 15. Above the shoulder 26, there is provided an adjusting nut 27 on the screw 19 to facilitate the vertical adjustment of a sleeve or bearing 28 which carries a radial clamping or holder arm 29 having a depending rubber lens blank engaging element 30 at its free end. Above the sleeve 28, the screw 19 receives a crown nut 31 which may serve as a knob when turning the holder arm 29 to any desired position relative to a lens blank 32 positioned slidably on the top face of the plate 15. The coil spring 20 acting on the head 33 of screw 19 causes the arm 29 and resilient element 30 to bear down yieldingly but firmly on the top of the curved lens blank 32. The precise vertical position of the arm 29 on the screw 19 may be varied by adjusting the nut 27 upwardly or downwardly. The arm 29 is turnable circumferentially around the axis of the screw 19 which is located near one corner of the light box as best shown in FIG. 1.

Within the light box centrally and below the center of the protractor card 16 is a light bulb 34 supported on one of the side walls 11 and having a suitable on and off switch 35, and a cable 36 for connection with a convenient outlet. When the light bulb is energized, light is transmitted through the protractor card 16, plate 15 and lens blank 32 which may be a tinted or clear lens blank. The technician makes the proper markings on the lens blank 32 as described in the Line patent after first positioning the blank relative to the protractor indicia 17 and clamping it in a fixed position through the use of the holder means including arm 29 and resilient element 30. The lens blank is readily shiftable in any direction by merely elevating the arm 29 against the downward holding pressure of the spring 20. The lens blank may be shifted in any direction and re-clamped by the element 30.

The opaque light box further includes a readily removable rear wall or panel 37 having a top horizontal groove 38 of the same dimensions as the three sided groove 13 and communicating with the latter, FIG. 2. The removable panel 37 has a pair of openings 39 in its side vertical edges receiving locking screws 40 on the side walls 11 near the upper rear corners of the apparatus. Fixed pins 41 on the side walls 11 near their lower rear corners engage releasably within short vertical slots 42 in the side edges of the panel 37 at its lower end. The panel 37 has a ventilating slot 43 formed therethrough near its bottom and plural vent openings 44 are provided in the panel near its top so that air can circulate through the light box and dissipate the heat produced by the bulb 34.

In order to quickly remove the protractor and lens holder assembly 14 composed of the elements 15 and 16 and all of the parts in FIG. 5, it is merely necessary to retract the locking screws 40 and to swing the rear panel 37 slightly rearwardly at the top and remove it upwardly as shown by the arrow in FIG. 2, the pins 41 merely passing through the open lower ends of the positioning slots 42 to permit this removal. This allows the entire assembly 14 to be slid rearwardly from the groove 13 of body portion 10 so that the assembly can be replaced by another one. Such new assembly slides into the groove 13 and the rear panel 37 is moved back into place and its groove 38 receives the rear edge of plate 15 and card 16, as shown in FIG. 2.

The use of the light box and protractor in connection with laying out guide markings on spectacle lens blanks is fully explained in the Line patent and need not be discussed herein. The present invention is concerned entirely with mechanical simplification of the apparatus, rendering it more economical and practical, as explained. More particularly, the lens holding or clamping means has been simplified and the arrangement whereby the entire protractor and lens holder unit assembly 14 may be quickly removed is a principal improvement feature.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A spectacle lens layout apparatus comprising a light box body having three rigidly connected side walls, one open side and an open bottom, two of said side walls being in parallel relation and perpendicular to the third side wall, said light box body also having an open top and said open top lying in an inclined plane which converges with a plane defined by the open bottom of said light box body, said light box body having an internal groove formed in the interior surfaces of said three side walls immediately below the inclined plane of said open top and being parallel to said inclined plane, said groove extending continuously without interruption around said three side walls of the light box body, a protractor and lens blank holding assembly of rectangular plate form slidably and removably engageable in said groove and completely overlying and covering the open top of the light box body when positioned fully within said groove, a source of light in said light box body centrally and beneath said protractor and lens blank holding assembly to illuminate the latter, and a readily removable rear vertical side wall for said one open side of the light box body having a straight horizontal groove formed in its inner face immediately below its top edge adapted to receive and interlock with the rearward edge of said lens blank holding assembly, said rear side wall having a pair of short vertical positioning slots in its lower corners, a pair of positioning pins fixed to the lower rear corners of said two parallel side walls of the light box body and entering said slots when the rear side wall is placed downwardly thereover, and a pair of locking screws on the upper rear corners of said two parallel side walls adapted to enter locking openings in the side vertical edges of said rear side wall near and below the horizontal groove thereof for locking the rear side wall securely to the light box body with said groove of the rear side wall engaged with the rear edge of said protractor and lens blank holding assembly.

* * * * *